G. N. PENNINGTON.
TIRE CHAIN HOLDER.
APPLICATION FILED DEC. 21, 1918.
1,333,184.
Patented Mar. 9, 1920.
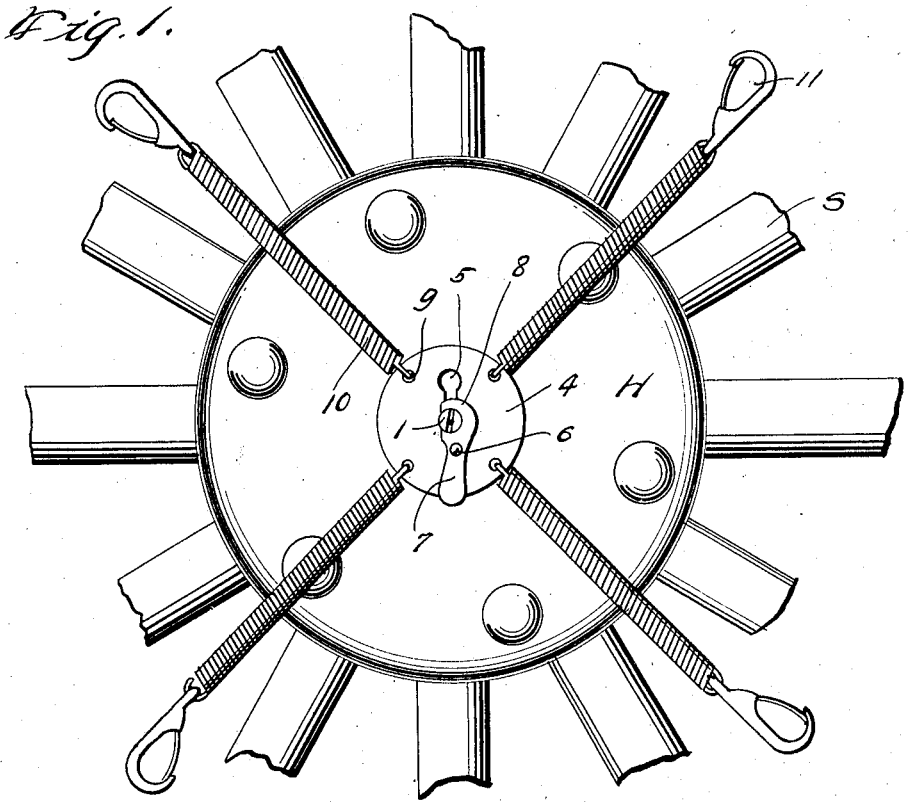
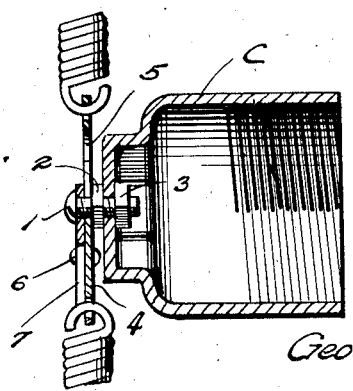
INVENTOR
George N. Pennington
WITNESSES
BY
ATTORNEY

UNITED STATES PATENT OFFICE.

GEORGE N. PENNINGTON, OF MILLVILLE, PENNSYLVANIA.

TIRE-CHAIN HOLDER.

1,333,184.  Specification of Letters Patent.  Patented Mar. 9, 1920.

Application filed December 21, 1918. Serial No. 267,796.

*To all whom it may concern:*

Be it known that I, GEORGE N. PENNINGTON, a citizen of the United States, residing at Millville, in the county of Columbia and State of Pennsylvania, have invented certain new and useful Improvements in Tire-Chain Holders, of which the following is a specification.

This invention relates to resilient tires, and more especially to anti-skid chains for temporary attachment thereover when the roads are slippery; and the object of the same is to produce a device for holding the well-known tire chains on the wheels.

Another object is to produce a tire chain holder of this character which may be applied to the cap nut on most any wheel whose hub is so equipped, thus producing a tire chain holder which is capable of use on a wide variety of cars.

The following specification sets forth the preferred manner of carrying out my invention, reference being made to the drawings, wherein:—

Figure 1 is an elevation of the wheel hub with this attachment applied,

Fig. 2 is a vertical section through the cap nut of said wheel hub.

In the drawings the letter H designates the hub of a wheel from which radiates spokes S as usual, and C is a hollow or cap nut such as is commonly screwed onto the outer end of a hub over the axle spindle and nut to protect the latter from dirt and moisture. The tire chain may be of any conventional form and it is therefore, not deemed necessary to illustrate the same. The purpose of the present invention is to provide means for holding the tire chain in place, even though its ends should become detached from each other.

In the drawings the numeral 1 designates a bolt which is passed through a hole in the center of the outer end of the cap nut and held therein by means of two nuts 2 and 3 so disposed on the shank of the bolt that its head shall project beyond the outermost nut 2. The numeral 4 designates a plate or disk provided with a key-hole opening 5, and pivoted at 6 to this disk is a catch 7 having at one end a handle and at the other end a hook 8 adapted to pass across the small end of the key-hole opening 5 when this catch is swung on its pivot. The disk is also provided near its periphery with a plurality of holes 9 into each of which is fastened the inner end of a coiled spring 10, and the outer end of the spring carries a snap hook 11 or similar device for attachment to the tire chain which is not shown.

In use, the large end of the key-hole opening is slipped over the head of the bolt 1 and the disk 4 moved so that the bolt passes into the small end of this opening; then the catch 7 is swung on its pivot so that its hook engages over the shank of the bolt and the parts are connected as shown in the drawings. Now the snap hooks are taken in hand and moved radially outward from the disk so as to put the helical springs 10 under tension and the snap hooks engaged at equi-distant points with the tire chain in a manner which will be clear. The tendency of the springs 10 is to draw said chain at these points toward the center, and therefore the chain is held upon the tire and upon the wheel and slackness taken up thereby. It will be obvious that the bolt 1 with its nuts 2 and 3 may be tapped into or fastened through the outer end of any ordinary cap nut C with which the hub is equipped, and therefore my device becomes an attachment which may be applied to automobiles of a wide variety of makes.

The foregoing description and the drawings have reference to what may be considered the preferred, or approved form of my invention. It is to be understood that I may make such changes in construction and arrangement and combination of parts, materials, dimensions, et cetera, as may prove expedient and fall within the scope of the appended claims.

Having thus fully described my invention, what I claim as new and desire to secure by Letters Patent, is:—

1. In a tire chain holder, the combination with a disk provided with a key-hole opening, a catch pivoted to said disk and having one end hooked and adapted to swing across the small end of said opening, and a series of radial springs connected at their inner ends with said disk and having means at their outer ends for attachment to a tire chain; of a cap nut, a headed bolt for attachment to the axis of the cap nut and receivable through said opening.

2. In a tire chain holder, the combination with a disk provided with a key-hole opening, a catch pivoted to said disk and having one end hooked and adapted to swing across the small end of said opening, and a series of radial springs connected at their inner ends with said disk and having means at their outer ends for attachment to the tire chain; of a bolt having a head of a size to pass through the larger end of said key-hole opening, its shank adapted for passing through the center of a cap nut, and nuts on said bolt at either side of the center of the cap nut, as described.

In testimony whereof I affix my signature in presence of two witnesses.

GEORGE N. PENNINGTON.

Witnesses:
 CHAS. R. NAGLE,
 J. W. HIDLAY.